Sept. 24, 1968 W. H. PECK 3,402,821

CENTRIFUGAL SEPARATOR

Filed Aug. 31, 1966 2 Sheets-Sheet 1

INVENTOR:
WILLIAM H. PECK
By

Sept. 24, 1968 W. H. PECK 3,402,821
CENTRIFUGAL SEPARATOR
Filed Aug. 31, 1966 2 Sheets-Sheet 2

INVENTOR:
WILLIAM H. PECK
By *Norman Nerlad*

– Patented Sept. 24, 1968

3,402,821
CENTRIFUGAL SEPARATOR
William H. Peck, Tulsa, Okla., assignor of one-third to
William H. Peck, Jr., San Antonio, Tex.
Filed Aug. 31, 1966, Ser. No. 576,322
11 Claims. (Cl. 210—325)

The present invention relates generally to a centrifugal separator and has more particular reference to a separator of the type which is employed for separating a liquid from a solid substance as, for example, in connection with the drying of sand, coal and various other granular materials.

The objects of this invention are manifold, a general object being to provide a centrifugal separator which will remove a maximum amount of liquid or moisture from the solid substance or substances in a minimum length of time or which, stated otherwise, has a greater moisture-removing capacity than previously designed similar separators for the same purpose.

In carrying out this general object, the invention contemplates in connection with a centrifugal separator the provision of a high-speed rotary carrier on which there is mounted a series of independently rotatable slurry-receiving baskets which are circumferentially spaced and, therefore, during rotation of the carrier orbit about the axis of rotation of the carrier. A rotary spider having radially extending feed channels deposits the slurry in the central region of each basket during the orbiting and rotational movements of the latter and each basket is provided with filter means which is dependent upon centrifugal phenomena to separate liquid from the solid substance or material and to discharge the former into a surrounding outer liquid discharge apron and the solid material from an inner annular discharge apron.

It is a specific object of the invention to provide a novel association of a rotary orbiting slurry-receiving basket and a filter means wherein centrifugal phenomena are effective, not only to pass the liquid radially outwardly of the carrier and into the liquid discharge apron, but also repeatedly to exert a self-cleaning action on the filter means. In carrying out this last mentioned object, the invention contemplates the use of a filter screen which, by reason of its shape characteristics and positioning within the basket, performs repeated alternate filtering and self-cleaning operations. To attain this end, the screen is eccentrically mounted on the orbiting basket so that it will assume inner and outer ecliptic positions with respect to the axis of rotation of the carrier and its own rotational axis. When occupying an outer ecliptic position, one side of the screen is presented counter to the direction of centrifugal force and toward the slurry so that the latter is forced against the screen for screening purposes. When occupying an inner ecliptic position, the same side of the screen is presented in the direction of centrifugal forces and toward the slurry so that solid particles which ordinarily would tend to clog the screen during a subsequent pass of the slurry therethrough are flung free from the screen by centrifugal force. In this manner, the tendency for solid particle build-up on the filter screen is avoided. In various intermediate positions of the filter screen when the same is moving between its outer and its inner ecliptic positions, as described above, the screen assumes a generally radial position with respect to the axis of rotation of the carrier so that solid particles from which liquid or moisture have been removed by the previous filter action are slid over the surface of the screen, while at the same time, they are caused to be discharged radially outwardly in all directions with respect to the central axis of revolution of the basket, i.e., the central axis of the basket carrier.

A further specific object of the invention is to provide in connection with a centrifugal separator a novel slurry-feeding distribution system whereby slurry contained in a central hopper above the level of the carrier is caused to have a divided flow through respective distribution channels leading to the central regions of the various baskets, the flow taking place partly by reason of gravitational force and partly by reason of centrifugal force. By such an arrangement, particle build-up in, or clogging of, the feed distribution passages or channels which otherwise might take place under the influence of a purely gravitational feed, is effectively avoided.

A still further object of the invention is to provide a novel form of filter screen per se, the screen being so constructed that its abrasion-resistant qualities are superior to those of any conventional steel wire screen. According to the present invention, a steel filter screen is employed as the basic filter screen element, but the screen is protected by a rubber or other elastomeric shield which, itself, has screening characteristics and exerts a screening function in a novel manner whereby solid particles are maintained out of contact with the basic steel screening until after their impact force has been dissipated against the elastomeric material. A further feature of the protective elastomeric shield resides in its ability to shed solid particles during the self-cleaning cycle of the screen, the interstices between adjacent portions of the shield opening-up, so to speak, under the influence of gravitational forces to release the solid particles.

The provision of a centrifugal separator which is generally of improved design; one which is capable of ease of assembly and dismantlement for purposes of inspection, replacement or repair of parts; one which is rugged and durable and will, therefore, withstand rough usage; one in which the driving mechanism for the carrier and the individual rotating orbiting baskets are effectively shielded against contamination by solids; and one which, otherwise, is well adapted to perform the services required of it, are further desirable features which have been borne in mind in the production and development of the present invention.

Other objects and advantages of the invention, not at this time enumerated, will become readily apparent as the nature of the invention is better understood from a consideration of the following detailed description or specification.

In the accompanying two sheets of drawings forming a part of this specification, one illustrative embodiment of the invention is shown.

Figure 1:
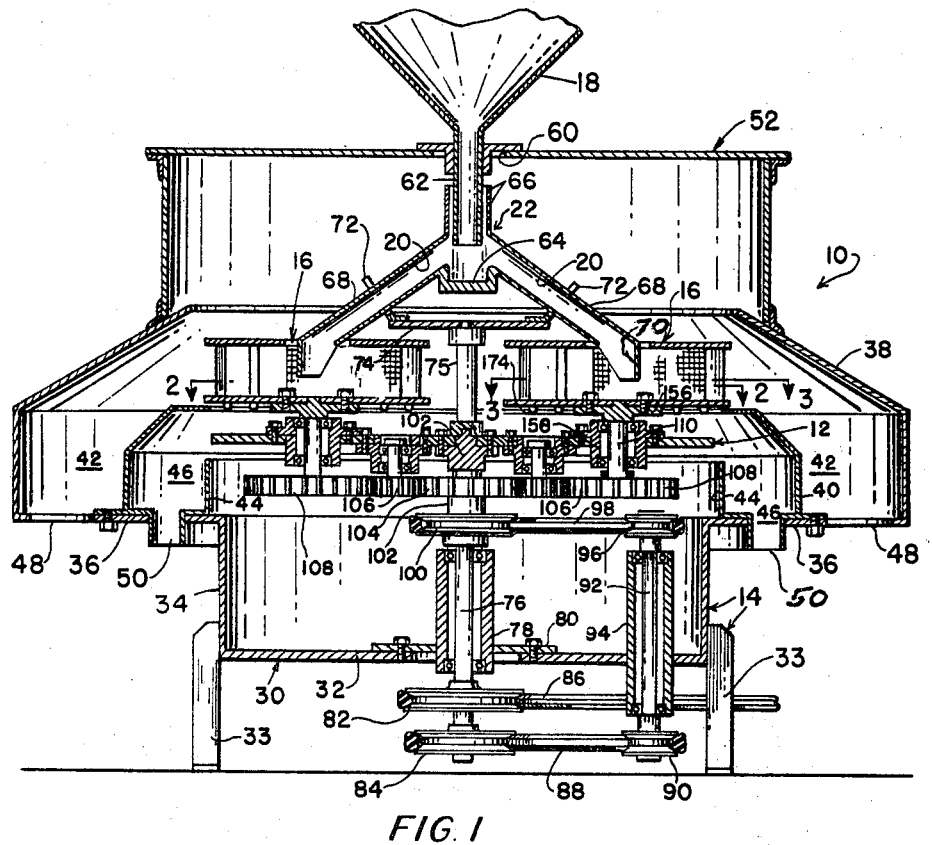
FIG. 1 is a sectional view taken substantially centrally and vertically through a centrifugal separator embodying the present invention.

Referring now to the drawings in detail and in particular to FIG. 1, the invention is embodied in a centrifugal separator 10 which includes or comprises a carrier 12 in the form of a horizontal rotatable deck plate of circular configuration. Such carrier is mounted for rotation about a central vertical axis and is rotatably supported in a manner that will be described presently on a stationary framework 14, the latter forming a part of the separator 10. Rotatably and eccentrically mounted on the carrier 12 for rotation about respective vertical axes are two diametrically disposed slurry-receiving filter assemblies 16 (hereinafter referred to as "baskets"), such assemblies being, in addition to their rotational movements, capable of orbital movement about the central vertical axis of the carrier 12. The carrier is adapted to be rotated at a relatively high speed which may be on the order of 900 revolutions per minute, while the individual baskets 16 are adapted to be rotated at a relatively slow speed, such, for example, as on the order of one revolution per minute. A feed hopper 18 for slurry is disposed above the carrier 12 and is adapted to feed slurry to two downwardly and outwardly extending distribution channels 20 which are associated with a rotatable spider assembly 22, the aforementioned channels discharging the slurry into the orbiting baskets 16 in the central region thereof.

Figure 2:
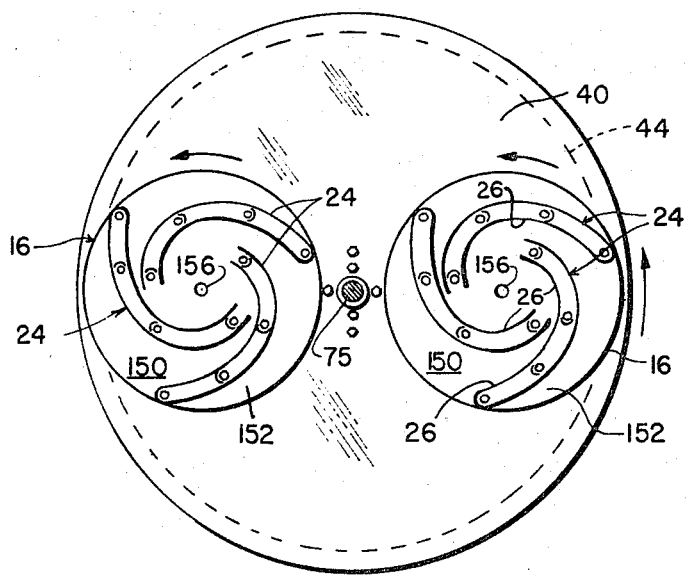
FIG. 2 is a horizontal sectional view taken on the line 2—2 of FIG. 1.

As best seen in FIG. 2 of the drawings, each basket 16 is provided with a series of three filter screen units 24 of generally involute design, the units being nested or arranged around the central region of the basket in generally circumferentially spaced relationship. Each unit 24 includes a filter screen proper 26 (see also FIG. 3) which, during rotation of the associated basket, itself orbits about the orbiting vertical axis of rotation of the basket.

From the above brief description, it will be apparent that, with the baskets 16 orbiting about the central vertical axis of the carrier 12, and with the individual filter screens 26 orbiting about the vertical axes of rotation of their respective baskets in Sun-Earth-Moon relationship, when the filter screens assume outside ecliptic positions with respect to the rotational axes of the baskets, they will be so disposed that they oppose the slurry which is deposited at the central regions of the baskets and receive such slurry thereagainst under the influence of the centrifugal force which is imparted thereto by the rapidly rotating carrier. When the filter screens 26 assume inside ecliptic positions with respect to the rotational axes of the baskets 16, they will be so disposed that the former slurry-receiving sides thereof now face in the general radial direction of centrifugal movement of the slurry so that any adhering solid particles on the screens will be flung therefrom radially outwardly of the carrier and diametrically across the baskets, thus purging the screens of any adhering particles and conducting these particles to such filter screens as may, at that time, assume outside ecliptic positions. Such, in essence, constitutes the principal novelty of the present invention.

Considering now the centrifugal separator 10 in greater detail, the stationary framework 14 involves in its general organization a generally cylindrical chassis member 30 which is of deep cup or bowl-shaped configuration and includes a circular bottom wall 32, a continuous side wall 34, and an annular, horizontally extending, radial rim flange 36. Legs 33 serve to support the chassis member 30 in an elevated position with respect to the supporting surface on which the separator as a whole is positioned. Supported at the extreme peripheral region of the rim flange 36 is an outer, generally circular, solids discharge apron 38 and, similarly supported in the medial region of said rim flange 36 is an inner, generally circular, solids discharge apron 40. The aprons 38 and 40 define therebetween an annular solids discharge compartment 42, while the inner apron 40, in combination with an upstanding inner wall 44, defines an annular liquid discharge compartment 46. The annular compartments 42 and 46 have associated therewith respective annular, downwardly facing, discharge outlet openings 48 and 50. A cap-like hood assembly 52 is positioned over, is supported on, and closes the upper open rim of the solids discharge apron 38.

The hood assembly 52 is formed with a central opening 60 through which there projects the depending stem portion 62 of the previously mentioned funnel-shaped slurry-receiving hopper 18. The lower end of the stem portion 62 opposes a horizontal steel wear plate 64 at the bottom of a vertically extending slurry distributing manifold 66 and the latter communicates laterally with a pair of downwardly and outwardly inclined branch conduits 68 which establish or constitute the aforementioned downwardly and outwardly extending slurry distributing channels 20 that lead to the central regions of the two baskets 16. Vertical plates 70 at the lower or outer discharge ends of the conduits 68 direct the slurry vertically downwardly into the baskets. The manifold 66 and its branch conduits 68 are rotatable about the vertical axis of the carrier, the spider assembly 22 which includes these parts being carried in brackets 72 which are mounted on a rotary horizontal plate 74. The latter is disposed at the upper end of a vertical extension 75 of the main vertical drive shaft 76 which establishes the axis of rotation of the carrier 12.

The drive shaft 76 of the centrifugal separator 10 is rotatably supported in an elongated, vertically extending sleeve bearing 78 which is secured by a horizontal mounting plate 80 to the bottom wall 32 of the chassis member 30. The lower end of the shaft 76 projects below the bearing 78 and has mounted thereon fixed upper and lower pulleys 82 and 84. The pulley 82 is operatively connected to a rotary power-driven drive pulley (not shown) by means of an endless belt 86, such drive pulley constituting, in effect, part of a driving source for the separator as a whole. The lower pulley 84 is connected by an endless belt 88 to a smaller pulley 90 which is carried on and fixedly connected to a vertical jack shaft 92, the latter being rotatable in a vertical sleeve bearing 94 which is supported from the bottom wall 32 of the chassis member 30. The upper end of the jack shaft 92 carries a fixed pulley 96 which is connected by an endless belt 98 to another pulley 100. The last mentioned pulley is rotatably or loosely mounted on the drive shaft 76 by means of a hub 102 which carries a sun gear 104. The latter meshes with two small idler gears 106 which, in turn, mesh with respective planet gears 108 on two vertical stub shafts 110. The upper ends of such stub shafts serve to support the two baskets 16 respectively.

From the above description, it will be apparent that a power train extends from the aforementioned driving source which may include a suitable electric motor (not shown) through the belt 86 and the pulley 82 directly to the drive shaft 76 which supports the carrier 12. A second power train extends from the aforementioned drive source through the belt 86, the pulleys 82 and 84, the belt 88, the pulley 90, the jack shaft 92, the pulley 96, the belt 98, the pulley 100, the hub 102, and the gears 104, 106 and 108 to the two baskets 16. Since the planet gears are constrained to rotate in the same direction as the sun gear and, furthermore, since the number of teeth on each of the planet gears is in excess of the number of teeth on the sun gear, the differential action which is set up during orbital movement of the planet gears about the central vertical axis of the carrier will effect an appreciable gear reduction as between the rate of rotation of the carrier 12 and that of the two baskets 16 about their respective vertical axes during orbital movement thereof. Various gear ratios have been found to be effective within fairly wide limits, but it has been found that if the rotational speed of the carrier 12 is maintained appreciably in excess of the rational speed of the individual baskets 16, optimum conditions of solid and liquid separation will be attained in connection with the drying of commercial foundry sand or any similar material.

Figure 3:
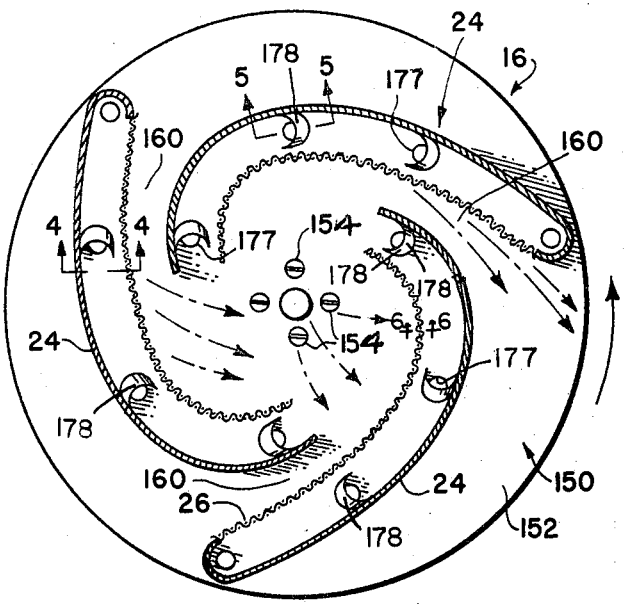
FIG. 3 is an enlarged horizontal sectional view taken on the line 3—3 of FIG. 1.
Figure 4:
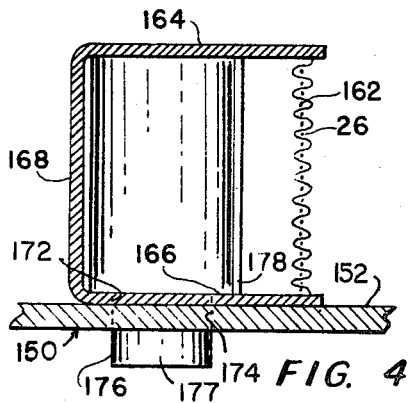
FIG. 4 is an enlarged vertical sectional view taken on the line 4—4 of FIG. 3.
Figure 5:
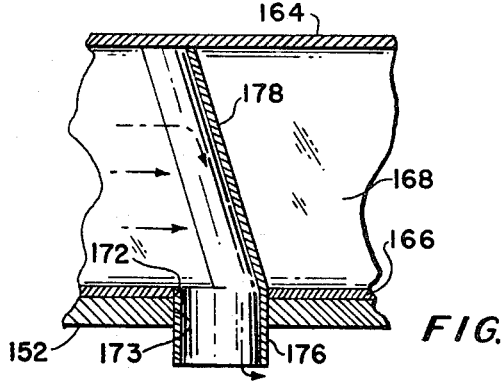
FIG. 5 is a sectional view taken on the line 5—5 of FIG. 3.

Referring now to FIG. 3, 4 and 5, the two baskets 16 are of identical construction and, therefore, a description of one of them will suffice for the other. Each basket 16 involves in its general organization a base plate 150 which is of circular configuration and present a flat upper slurry-receiving surface 152. The plate 150 is fixedly secured by fastening screws 154 to a mounting hub 156 which is formed on the upper end of the associated stub shaft 110, such stub shaft being journalled in a vertical sleeve bearing 158 which is carried by the plate 150. Each of the three filter screen units 24 is comprised of a generally cycloidal length of channel stock having a slight involute curvature and establishing, in effect, a liquid collection trough or receptacle. The three filter screen units of each basket are so disposed on the upper surface 152 of the associated base plate 150 that they form a nested arrangement wherein their inner ends are equally spaced radially outwardly from the axis of the stub shaft 110 and are 120° removed from one another in a circumferential direction as shown in FIG. 3. The outer ends of the filter screen units 24 are similarly equally spaced from the axis of the stub shaft 110 and also are equally circumferentially spaced. The outer end regions of the units overlap the inner end regions of adjacent units in the trailing direction of rotation of the basket as clearly shown in FIGS. 2 and 3. The open sides of the channel stock face inwards or toward one another in tripartite relationship and the three units define among themselves three diverging passageways 160 for outward flow of solids from the central region of the basket.

The open side of each involute length of channel stock is bridged by one of the previously mentioned filter screens proper 26 which are of novel construction, these screens proper being illustrated in FIGS. 3 and 4 by conventional screening cross sectioning. Actually, however, a special form of screen material is employed and is illustrated in detail in FIG. 6, the nature of such screen material being described in detail subsequently. Each channel length includes an upper horizontal wall 164 (see FIG. 4), a lower wall 166, and a vertical wall 168, the latter constituting the channel web. The lower wall 166 seats squarely on the base plate 150 and is provided with a series of spaced apart holes 172 which are aligned with holes 174 in the base plate. Depending discharge tubes 176 are secured in the pairs of aligned holes 172 and 174 and project a slight distance below the bottom level of the plate 150, the lower ends of these discharge tubes communicating with the discharge compartment 46. The discharge tubes 176 establish, in effect, a series of laterally spaced discharge openings 177 (see FIG. 4) for each filter screen unit 24, these openings communicating with the discharge compartment 46. In the disclosed form of filter screen units 24, each unit is provided with four such discharge openings 177 but it is to be understood that a greater or a lesser number of such openings may be provided if desired.

As shown in FIG. 4, each of the discharge openings 177 except the opening which is nearest the periphery of the plate 150, i.e., the opening which trails the other openings in the direction of rotation of the plate, has associated therewith a collection hood or shield 178 which partially encompasses the opening and has its open side facing generally toward the leading end of the filter screen unit 24. The various collection shields 178 are inclined at a relatively steep angle on the order of 75° toward the leading end of the channel length.

Disregarding for the present the specific character of each filter screen proper 26, in the operation of the herein described centrifugal separator 10, slurry which is introduced into the feed hopper 18 is discharged against the horizontal protective wear plate 64 and flows radially outwardly and downwardly to provide a divided flow through the distribution channels 20 for discharge into the baskets 16 in the central regions thereof. Each basket 16 thus continuously receives slurry during its orbital movement about the vertical axis of the carrier 12, the slurry being deposited on the slowly rotating base plate 150 substantially in the center of the nested arrangement of the three filter screen units 24. It will be recalled that the rate of rotation of the baskets is relatively slow so that such rotational movements thereof impart little or no centrifugal potential to the slurry that is deposited on the base plates 150 of the two baskets. However, since the rate of rotation of the carrier 12 is relatively great, as soon as the slurry is deposited on the base plates 150, a high centrifugal force is imparted thereto tending to fling the same outwardly of the carrier and radially across the surfaces of the rotating base plates away from the axis of the carrier. Due to the previously described overlapping arrangement between the trailing region of each involute filter screen unit and the leading region of the next adjacent unit, some portion at least of one of the filter screen units will be disposed in the path of movement of the slurry on each base plate and thus slurry will be forcibly projected against the filter screen proper 26 of such one filter screen unit for screening purposes. Due to porosity of the particular filter screen proper 26, water will pass therethrough while the sand or other solid material will be restrained and will collect on the screen proper. The water which passes through the screen proper will be collected in the channel length, much of it being caught by the hood-like shields 178 and directed downwardly through the discharge openings 176 and into the annular liquid discharge compartment 46. Where an excessive amount of water is present, the channel length may become nearly filled with water, in which case it will spill downwardly through the openings 176.

As each filter screen unit 24 continues to rotate about the central vertical axis of its associated basket 16, it changes its direction gradually so that the partially dried sand or other solid material from which some water has been flung by centrifugal force will tend to slide along the associated filter screen proper 26 in its direction of length, this sliding action also being initiated by the centrifugal force which always is present upon the slurry within the confines of each basket 16 due to the relatively high speed of rotation of the carrier 12. As each filter screen 26 assumes a position wherein it is generally radially disposed with respect to the axis of the carrier 12, this partially dried solid material slips off the trailing end of the filter screen proper as illustrated by the arrows at the right-hand side of FIG. 3, and moves over the peripheral edge of the base plate 150 from whence it falls into the annular solids discharge compartment 42.

As the filter screen proper 26 of each filter screen unit 24 continues to change its direction and assumes a position between the axis of the carrier 12 and the axis of the associated basket 16, the receiving side of the screen proper will then face radially outwardly away from the axis of the carrier and such material as ordinarily would tend to adhere to the screen is acted upon by centrifugal force to fling the same radially outwardly of the carrier and back toward the central region of the basket as indicated by the arrows at the left side of FIG. 3. Such material, finding no obstruction to its movement, will then be flung diametrically across the basket and be caught by an opposing filter screen unit 24 which, at this time, has moved into position on the side of the axis of the basket remote from the axis of the carrier. In this manner, the filter screens proper 26 are subjected to alternate screening and self-cleaning operations, the existence of which constitute one of the principal features of the present invention.

Figure 6:
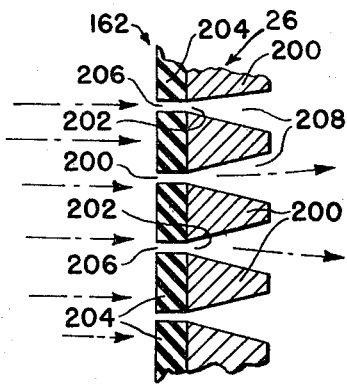
FIG. 6 is a vertical sectional view taken on the line 6—6 of FIG. 3.

Considering now the nature of the filter screens proper 26, each screen proper is preferably, but not necessarily, of special construction although the use of conventional criss-cross steel screen material may, if desired, be employed at the expense of a short screen life. As shown in FIG. 6, the preferred form of filter screen proper consists of a series of parallel, horizontally extending, screen bars 200 which are formed of steel and are of trapezoidal cross section. The screen bars 200 are arranged so that the large bases thereof are in coplanar relationship and establish therebetween narrow screening slots 202. These bases have bonded thereto by vulcanization or other suitable adhering process rubber or other elastomeric strips 204 of appreciable thickness, the strips conveniently being formed by placing a sheet of the elastomeric material against the bar assembly and thereafter slitting the elastomeric sheet to provide horizontally elongated slots 206 in register with the screening slots 202. By such an arrangement, the oncoming solid materials undergoing dehydration are opposed by the elastomeric material of the strips 204 and the steel screen bars 200 are thus protected from the abrasive action of the solid material which is being separated. On the discharge side of each filter screen proper 26, a series of diverging or wedge-shaped trough-like voids 208, between adjacent steel bars 200, discourage particle-adherance of any loose undersize particles which may enter between adjacent bars and thus pass through the slots 206.

From the above description, it is believed that the nature and operation of the present centrifugal separator will be readily apparent without further description. The invention is not to be limited to the exact arrangement of parts shown in the accompanying drawings or described in this specification as various changes in the details of construction may be resorted to without departing from the spirit or scope of the invention. For example, whereas only two baskets 16 have been disclosed herein in diametrically disposed positions on the carrier 12, a greater number of such backets may be employed if desired. In such an instance, the baskets will be equally and circumferentially spaced about the carrier and the distribution spider 22 will be modified to include a commensurate number of distribution channels 20. It will be understood that speed changes in the rates of rotation of the carrier or of the baskets may be varied as desired by substitution of different size pulleys or gears, all in accordance with calculated engineering expediencies. Therefore, only insofar as the invention has been particularly pointed out in the accompanying claims is the same to be limited.

Having thus described the invention what I claim as new and desire to secure by letters patent is:

1. A centrifugal separator for dehydrating solids contained in slurry and comprising a horizontal carrier rotatable about a central vertical axis, a plurality of filter baskets eccentrically and rotatably mounted on said carrier in circumferentially spaced relationship for rotation about respective vertical axes and for orbital movement about the axis of the carrier, each basket incuding a base plate rotatable with the basket in a horizontal plane and adapted to receive slurry thereon in the central region thereof, distributon ducts mounted on and rotatable with the carrier and leading to the baskets for depositing slurry on said central regions of the baskets, each basket further including a series of filter screen units mounted on said base plate in circumferentially spaced relationship and including respective filter screens proper projecting upwardly from the upper surface of the base plate, said filter screens substantially encompassing said central region of the base plate and being so disposed that when an individual screen assumes an outer ecliptic position with respect to the axes of the carrier and basket slurry will be flung radially outwardly of the carrier by centrifugal force and against the screen, and when such screen assumes an inner ecliptic position slurry particles adhering to the screen will be dislodged from the screen by centrifugal force and flung diametrically across the basket, there being a series of liquid discharge openings in said base plate in the vicinity of each screen on the side thereof remote from the axis of rotation of the basket, a liquid collection trough embracing each series of openings and presenting an open side across which the associated filter screen projects, means for rotating said carrier at a relatively high rate of speed, and means for rotating said baskets at a relatively low rate of speed.

2. A centrifugal separator as set forth in claim 1 and wherein each filter screen is of cycloidal configuration and presents a slight involute curvature, the leading end region of each filter screen overlapping the trailing end region of an adjacent filter screen in a circumferential direction.

3. A centrifugal separator as set forth in claim 2 and wherein said filter screens are three in number and encompass said central region of the base plate in tripartite relationship.

4. A centrifugal separator as set forth in claim 2 and including, additionally, a collection hood in the vicinity of each liquid discharge opening and interposed between the opening and the bottom of the collection trough.

5. A centrifugal separator as set forth in claim 2 and wherein said liquid collection trough is in the form of a length of channel stock having an upper horizontal wall, a lower horizontal wall, and a vertical connecting web which estabishes the bottom of the trough, said lower wall being disposed in flush relationship on the upper surface of the base plate, said filter screen projecting across the open side of the length of channel stock, and closure flanges at the opposite ends of the length of channel stock, said lower wall being formed with openings therein in register with said discharge openings.

6. A centrifugal separator as set forth in claim 2 and including additionally, means establishing a fixed liquid discharge compartment in register with and common to said liquid discharge openings, and means establishing a solids discharge compartment in register with the periphery of said base plates.

7. A centrifugal separator as set forth in claim 2 and wherein said carrier and baskets are interconnected in driving relationship by gearing including a central sun gear on the carrier, a planet gear on each basket, and an idler gear operatively interposed between said sun gear and each of the planet gears.

8. A centrifugal separator as set forth in claim 2 and including, additionally, a feed hopper having a discharge outlet for slurry disposed above the level of the baskets, a distribution spider on said carrier and rotatable bodily therewith, said spider including a distribution manifold in register with said discharge outlet of the feed hopper, and downwardly and outwardly diverging branch conduits in communication with and projecting from the distribution manifold, said branch conduits establishing said distribution ducts leading to the baskets.

9. A centrifugal separator as set forth in claim 2 and wherein each filter screen is comprised of spaced apart parallel metal bars which are coated with an elastomeric material on the sides thereof which oppose the rotational axis of the associated basket.

10. A centrifugal separator as set forth in claim 9 and wherein said metal bars of the filter screen are generally trapezoidal in transverse cross section with large trapezoid bases which oppose the rotational axis of the associated basket, and strips of elastomeric material coextensive with and bonded to said bars on the sides thereof established by said large trapezoid bases.

11. A centrifugal separator for dehydrating solids contained in slurry and comprising a horizontal carrier rotatable about a central vertical axis, a plurality of filter baskets eccentrically and rotatably mounted on said carrier in circumferentially spaced relationship for rotation about respective vertical axes and for orbital movement about the axis of the carrier, each basket including a base plate rotatable with the basket in a horizontal plane and adapted to receive slurry thereon, distribution ducts mounted on and rotatable with the carrier and leading to the baskets for depositing slurry on the latter, each basket further including a series of filter screen units mounted on said base plate in circumferentially spaced relationship and including respective filter screens proper projecting upwardly from the upper surface of the base plate, said filter screens substantially encompassing the central region of the base plate and being disposed so that when an individual screen assumes an outer ecliptic position with respect to the axes of the carrier and basket slurry will be flung radially outwardly of the carrier by centrifugal force and against the screen, and when such screen assumes an inner ecliptic position slurry particles adhering to the screen will be dislodged from the screen by centrifugal force and flung diametrically across the basket, there being a series of liquid discharge openings in said base plate in the vicinity of each screen on the side thereof remote from the axis of rotation of the basket, a liquid collection trough embracing each series of openings and presenting an open side across which the associated filter screen projects, means for rotating said carrier at a relatively high rate of speed, and means for rotating said baskets at a relatively low rate of speed.

References Cited
UNITED STATES PATENTS

| | | | |
|---|---|---|---|
| 1,655,774 | 1/1928 | Sansariq | 210—325 |
| 2,651,416 | 9/1953 | Van Der Mark et al. | 210—380 X |
| 3,216,577 | 11/1965 | Garrone | 210—380 X |
| 3,273,718 | 9/1966 | Riethmann et al. | 210—370 |

REUBEN FRIEDMAN, *Primary Examiner.*

J. DE CESARE, *Assistant Examiner.*